March 16, 1926.

J. V. ROBINSON 1,576,757

AUTOMATIC TRAIN PIPE COUPLING HEAD

Original Filed March 6, 1920    2 Sheets-Sheet 1

Inventor
Joseph V. Robinson,
By his Attorneys
Foster, Freeman, Watson & Coit.

March 16, 1926.

J. V. ROBINSON 1,576,757

AUTOMATIC TRAIN PIPE COUPLING HEAD

Original Filed March 6, 1920   2 Sheets-Sheet 2

INVENTOR
Joseph V. Robinson,
BY Fosk, Freeman,
Watson & Coit
ATTORNE

Patented Mar. 16, 1926.

1,576,757

UNITED STATES PATENT OFFICE.

JOSEPH V. ROBINSON, OF NEW YORK, N. Y.

AUTOMATIC TRAIN-PIPE COUPLING HEAD.

Application filed March 6, 1920, Serial No. 363,634. Renewed June 12, 1925.

*To all whom it may concern:*

Be it known that I, JOSEPH V. ROBINSON, a citizen of the United States, and a resident of New York, in the county and State of New York, have invented certain new and useful Improvements in Automatic Train-Pipe Coupling Heads, of which the following is a specification.

My invention relates to improvements in automatic train pipe coupling heads and has among its objects to provide a simple form of such head in which the gathering or registering means therefor is formed separately of the head whereby the manufacture of the head is greatly simplified and uniformity of the coupling contour of the head is readily maintained without resorting to any expensive or difficult manufacturing or machine operations.

Figure 1:
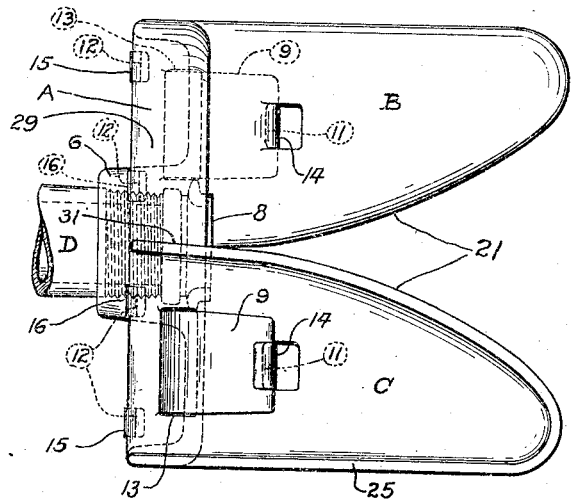

My invention consists of the combination, arrangements and constructions hereinafter described, pointed out in the appended claims and illustrated in the accompanying drawings, in which Figure 1 is a side elevation of my improved coupling head with the gathering or guiding means thereof applied.

Figure 2:
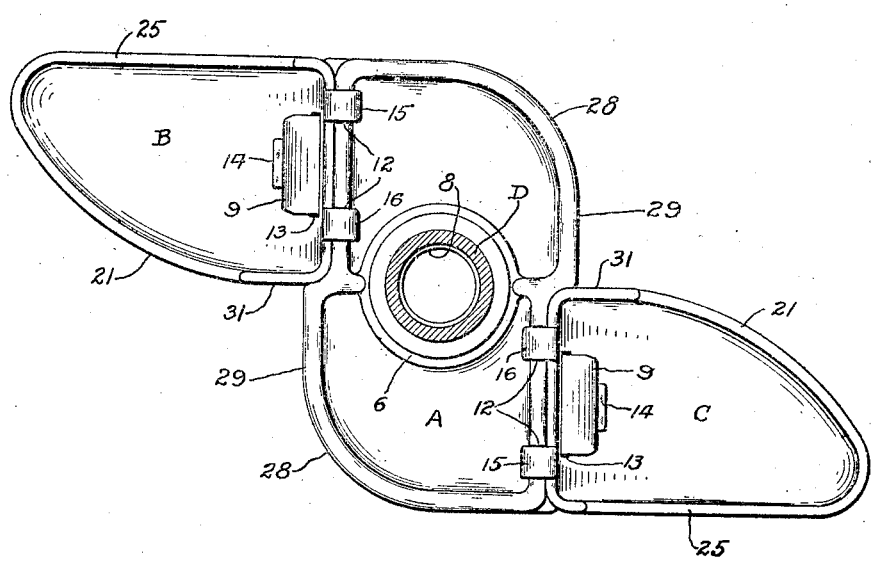

Figure 2 is a rear elevation of the structure shown in Figure 1.

Figure 3:
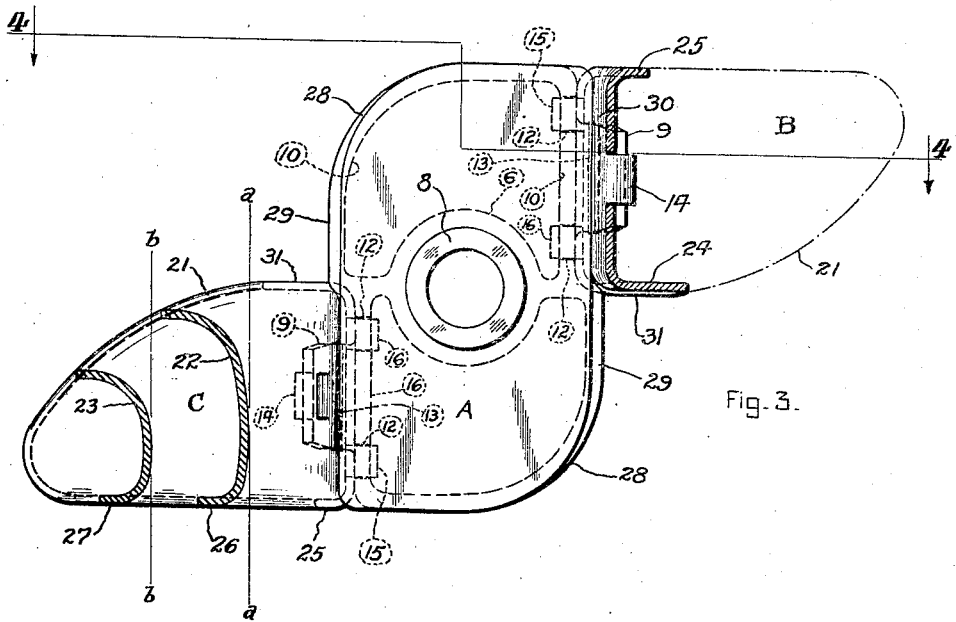

Figure 3 is a sectional elevation, showing my improved coupling head in front view. In this figure the upper guide is shown in section on the line 3—3 of Figure 3 and the lower guide is shown in section on the lines 4—4 and 5—5 of Figure 4.

Figure 4:
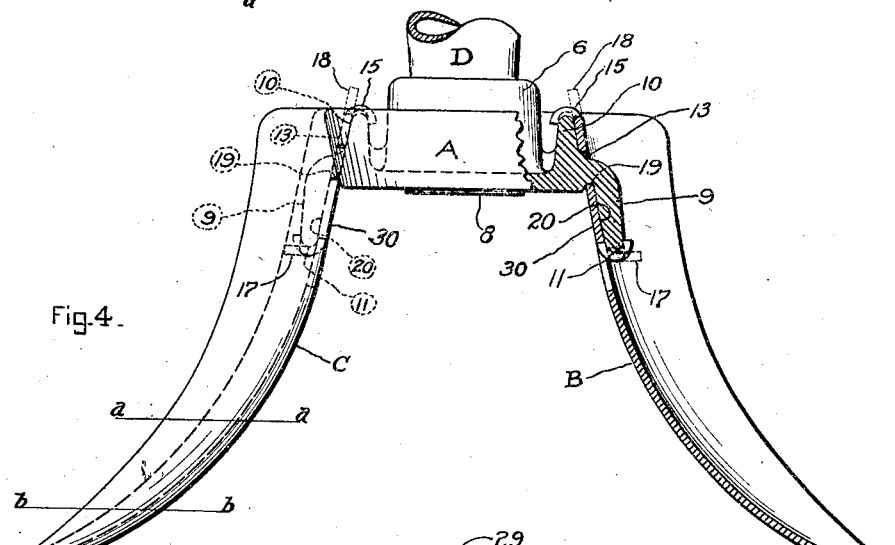
Figure 5:
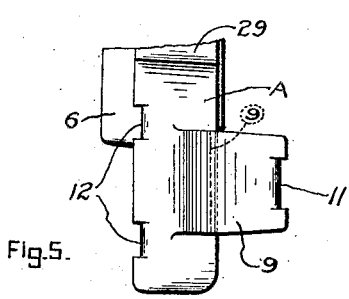

Figure 4 is a sectional plan view of my improvement taken on the line 4—4 of Figure 3, and Figure 5 is a detail of one of the locking prongs of my improvement.

Referring now to the drawings. My improved coupling head comprises a base A and a gathering means or guides B and C. Any suitable support may be used for flexibly supporting my improvement with respect to the car coupler of the car. A suitable form of such support is illustrated in my co-pending application, Serial No. 342,806, filed Dec. 5, 1919. I illustrate with my improvement the forward end of such a support, comprising a hollow conduit D suitably connected with the base A of my improvement.

As will appear from the drawings, my improved coupling head is of the butt face type, the base A thereof having a flat forward coupling face and being disposed in the vertical plane with the transverse axis of the base disposed at a right angle to the longitudinal axis of the supporting means or conduit D. The base is provided with a centrally located port or nipple 6 threaded at its rear end to receive the member D and provided at its forward end with a suitable gasket 8 which extends slightly in advance of the coupling face of the base A. The diagonally opposite sides of the base are provided each with a forwardly extending prong 9 which flares slightly outwardly from the base as illustrated particularly in Figure 4. These prongs are preferably formed integrally with a flange 10 which extends rearwardly of the coupling face of the base and the outer face of which flares inwardly at an angle conforming to the outward flare of the prong 9. The outer face of these flanges and the inner face of the prongs 9 lie in the vertical plane as shown particularly in Figure 4, the vertical width of the face of the flange 10 being considerably greater than that of the prong 9 as shown in Figures 2 and 3. The forward ends of the prongs 9 are provided with a recess or groove 11 while the ribs or flanges 10 are provided at their rear edge with a pair of similarly shaped grooves 12, as shown especially in the detail view, Figure 5. The guides B and C of my improved coupling head are rigidly secured to the base A through the medium of the prongs 9 and the flanges 10, the prongs 9 serving to position the guides on the base and to free them of undue stresses in service. The guides are provided with an opening 13 and with tongues or projections 14, 15 and 16, the projection 14 being struck from the face of the guides while the projections 15 and 16 extend from the rear end thereof. Each of the guides is hooked over its respective prong 9 by passing the prong through the opening 13 in the guide whereupon the guide is swung outwardly to the position shown in Figure 4. This outward swinging of the prong brings it into contact with the outer face of the flanges 10 and the inner face of the prongs 9, the projections 14, 15 and 16, aligning with their respective recesses or grooves 11 and 12 in the prong 9 and the flange 10 as shown, especially in Figures 3 and 4. When thus assembled the projections 14, 15 and 16 are rigidly pressed or rolled over from the position indicated by the dotted line 17 and 18 of Figure 4 into their respective grooves, as illustrated in Figure 4. This operation draws the guides B and C tightly into the vertically extending groove 19 at the base of the prong 9 and rigidly locks the guides to the base A. By reason of the distance between the projections 15 and 16, and the fit of the projection 14 in the groove 11 of the prong 9, the guides or wings B and C are accurately positioned both laterally and vertically with respect to the base A, when the guides or wings are clamped in position as just described. To insure accuracy of this registration or positioning of the guides on the base, I preferably machine the recess 14, the groove 19 and the inner face 20 of the prong 9.

As will appear from the drawings, the guides or wings B and C are secured to the upper and lower right and left hand corners of the base A. They extend forwardly of the base A and flare outwardly therefrom, and have guiding edges 21 which curve vertically as well as laterally with respect to the base A. These guiding edges 21 preferably flare, in cross section, as shown at 22, 23 and 24 of Figure 3, the flare or curve of the edges changing from an abrupt or substantially right angle turn as shown at 24 in Figure 3 to a variable or compound curve as shown at 22 and 23 of the same figure. To increase the strength of the wings or guides B and C, I preferably turn their outer edges 25 to substantially a right angle to the inner face of the guides, as shown especially at 26 and 27 of Figure 3.

It will be observed that the upper and lower opposite corners of the base A are rounded as at 28 and that the flange 10 hereintofore described extends completely around the base forming at 29 a rearwardly extending, outwardly flaring, vertically disposed bearing surface adapted to mate with the complementary bearing surface 30 at the base of the guides or wings B and C to accurately align opposing bases A with respect to lateral displacement, as the heads couple up in service. Vertical displacement of the heads and accurate alignment of the gaskets 8 of mating heads is effected through the medium of the guiding edges 21, the bases or shoulders 31 of which are located on substantially the transverse center line of the base A at the point where the guides leave the coupling face of the base A as shown especially in Figures 1 and 3. In coupling, a shoulder 31 of the guide B mates with the complementary shoulder 31 of the guide C, thus accurately effecting vertical alignment of the heads under all conditions of service. I preferably construct the guides or wings of my improvement of pressed steel though they may be drop forged or cast as desired. The base A of my improvement, I preferably cast of malleable iron though it also may be drop forged or cast of steel.

The foregoing construction produces a simple and efficient coupling head having a plurality of independent forwardly extending, outwardly diverging guiding wings, constructed separately of the base of the head detachably secured thereto whereby simplicity and uniformity of manufacture, and maximum service efficiency, is secured.

What I claim as new is:

1. An automatic train pipe coupling head, comprising in combination a base having a substantially flat coupling face arranged substantially at right angles to the longitudinal axis of the head, a pair of rigid guides arranged diagonally on opposite sides of said base and extending forwardly beyond said face and diverging outwardly, said guides being formed separately of said base and means for rigidly securing the guides to the base.

2. An automatic train pipe coupling head, comprising in combination a vertically disposed base having a forwardly extending projection, guiding means separate of said base and engaging said projections for positioning said guiding means on the base, and means for rigidly securing said guides to said projection and base.

3. An automatic train pipe coupling head, comprising in combination a base, a projection on said base, a guide separate of said base and provided with an opening through which said projection extends, means on said guide for positioning the guide relative to said projection, and means for securely locking said guide to said base and for preventing movement of the guide to said base.

4. An automatic train pipe coupling head, comprising in combination a base having a substantial flat face arranged at substantially right angles to the longitudinal axis of the head, a pair of rigid independent guides constructed separately of said base and diagonally spaced thereon and extending forwardly of said face and flaring laterally and vertically thereof and means on said guide and said base for securely locking said guides to said base.

5. An automatic train pipe coupling head, comprising in combination a base having a substantial flat face arranged substantially at right angles to the horizontal axis of the head, and a pair of rigid independent pressed steel guides constructed separately of said base and suitably secured thereto on opposite sides and extending forwardly of said face and outwardly therefrom, each of said guides having a guiding edge which flares laterally of said head and is adapted to co-operate with a similar guiding edge on a mating guide in coupling, each of said guides having also a bearing surface projecting forwardly of said base and adapted to mate with a complementary surface of an opposing coupling head in coupling, substantially as and for the purpose described.

6. An automatic train pipe coupling head, comprising in combination a base, a pair of forwardly extending diagonally spaced prongs on said base, a pair of guides each provided with an opening through which said prongs extend into engagement with the rear side of said guides, projections on said guides one of which engages said prong and the others of which engage the rear side of said base, a seat at the base of said prongs, and means for drawing said guides into tight engagement with said seat.

7. An automatic train pipe coupling head comprising a base, a pair of independent guides constructed separately of said base and diagonally spaced thereon and extending forwardly therefrom, each of said guides being provided with a plurality of tongues bent into engagement with said base whereby the guides are rigidly secured to the base.

8. An automatic train pipe coupling head comprising a base, a pair of independent guides constructed separately of said base and diagonally spaced thereon, said base having a forwardly projecting prong on each side against which said guides are positioned, and each of said guides having a tongue bent into engagement with said prong and means for securing each of said guides to the rear of the base.

9. In an automatic coupling head, a base, a pair of independent guides constructed separately of said base and diagonally spaced thereon, said base having a forwardly projecting prong on each side against which said guides are positioned, each of said guides having a tongue bent into engagement with said prong, and also having a plurality of tongues bent into engagement with the rear portion of the base, whereby said guides are secured to the base.

10. In an automatic coupling head, a base, a guide secured to the base and projecting forwardly thereof, said guide being constructed independent of the base and being provided with a plurality of integral tongues bent into engagement with the base whereby the guide is rigidly secured to the base.

11. In an automatic train pipe connector head, in combination, a base, a prong extending laterally from one side of said base and having a forwardly directed portion, and a guide member having an aperture to receive said prong and adapted to bear against the inner face of said prong and the side of said base.

12. In an automatic train pipe connector head, in combination, a base, a prong extending laterally from one side of said base and having a forwardly directed portion, a guide member having an aperture to receive said prong and adapted to bear against the inner face of the prong and the side of the base, and means for securing said base and guide together.

13. In an automatic train pipe connector head, in combination, a base, a prong extending laterally from said base and having a bearing surface facing toward the base, and a guide member having an aperture to receive said prong and adapted to bear against the inner face of said prong and the side of the base.

In testimony whereof I hereby affix my signature.

JOSEPH V. ROBINSON.